Sept. 18, 1951  D. YELLEN ET AL  2,568,676
RIVET HOLDER
Filed Feb. 10, 1947
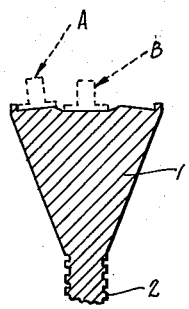
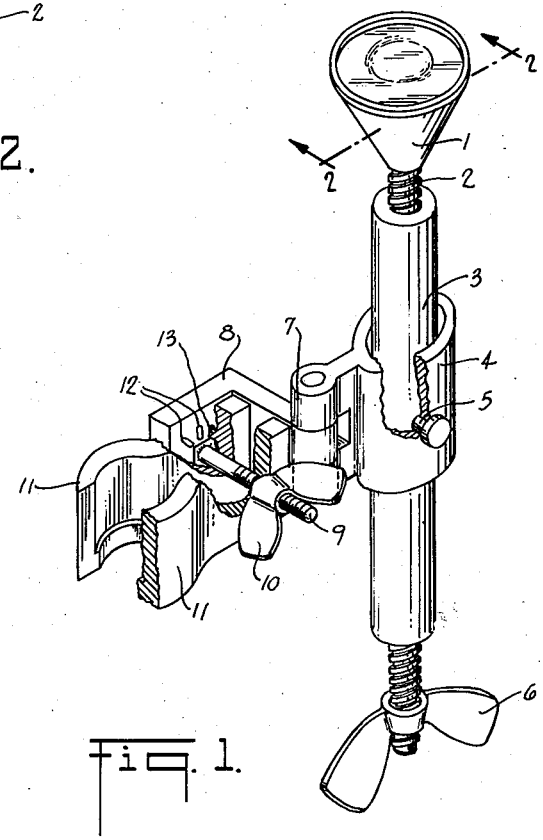
Fig. 2.
Fig. 1.
INVENTORS.
SEYMOUR MOSKOWITZ
DAVID YELLEN
BY
*Irving Seidman*
ATTORNEY Patented Sept. 18, 1951

2,568,676

UNITED STATES PATENT OFFICE 2,568,676

RIVET HOLDER

David Yellen and Seymour Moskowitz,
New York, N. Y.

Application February 10, 1947, Serial No. 728,748

2 Claims. (Cl. 78—53.5)

The object of this invention is to provide a rivet holder, attachable to a C clamp; said rivet holder to be used in a minimum amount of time to provide an easy and efficient means of holding a rivet joining two pieces of metal securely in place while the rivet is being "peened."

Other objects and advantages of this invention will become apparent upon further perusal of this specification.

Fig. 1 is an isometric view of the clamp (riveting).

Fig. 2 is a cross-sectional view of the anvil 1, and of the threaded shank 2.

All of the numerals used in this specification are set forth as characters of reference on the drawing.

Referring to Fig. 1, a portion of the isometric view is cut away to show clearly the hinge leaf 8, the two curved metal plates comprising the clamp attachment 11, the carriage bolt 9, and the wing-nut 10.

A second portion of the isometric view is cut away to show the assembly of the pin 5 to the female threaded sleeve 3, in a manner that is to be described more fully at a later point in this specification.

Fig. 2 is a view of the cross-section through the anvil 1 and threaded shank 2.

In greater detail the hinge leaf 8 contains within it, symmetrically cut out about its center point a square hole in which the head of the carriage bolt 9 is tightly fitted, and a series of radial grooves 12 into which keyways 13, situated at the end of the sidewall of the two curved metal clamp adjustment plates, are permanently secured, as is shown in an aforementioned cut away view of Fig. 1.

Although, for purposes of greater detail, only one keyway 13 is shown engaged in one of the radial grooves 12 in the cut away view of Fig. 1, referred to in the preceding paragraph, in actual practice an equal number of keyways 13 are engaged in an equal number of radial grooves 12. The function of the radial grooves 12 is to provide openings into which the keyways or protuberances 13 may be permanently force-fitted; in order that the curved metal plates 11, 11 of the clamping attachment may be affixed permanently to one another.

The clamp attachment 11 consists of two curved metal plates, one of the plates merely being an extension of hinge leaf 8, while the second plate is made up of three sections; namely: a curved section, a straight section containing about its center-point a hole through which the threaded shank of the carriage bolt 9 is allowed to pass and a third section or sidewall, which is at right angles to the straight section, and fits up snugly against the inner wall of the hinge leaf 8; the keyways 13 of the sidewall being permanently secured in the radial groove 12 as above mentioned in the preceding paragraphs.

C clamps are used in conjunction with the sheet metal hand riveting clamp described in this specification in order that two or more pieces of sheet metal may be secured in position by the C clamps, preparatory to passing a rivet through the holes in the various pieces of sheet metal. The regulation of the desired pressure to be exerted by the clamp attachment plates 11 upon either the ribs or the threaded shank of a C clamp, when affixing or detaching the clamp attachment 11 to or from the C clamp, is accomplished by turning the wing-nut 10 on the threaded shank of the carriage bolt 9. The curved sections of the metal clamp attachment plates 11 enables the plates to exert a firm grip on the threaded shanks and ribs of C clamps of varying dimensions.

Referring again in detail to Fig. 1, 1 designates an anvil, permanently attached to a threaded shank 2; the thread of said threaded shank 2 mating in a snug fit with the female threads of the sleeve 3. A wing-nut 6 is firmly secured to the lower end of the threaded shank 2.

The outer sleeve 4 is in the form of an ellipse and is joined to the hinge leaf 8 by means of the hinge 7; the hinge 7 and the elliptically formed sleeve 4 together constituting a single unit. Pins 5, 5, passing in a close fit through holes (only one hole appears in Fig. 1 which is in perspective, the other hole being diametrical opposite and hidden) provided for the purpose in the elliptically formed sleeve 4 is securely and immovably attached to the sleeve 3; thereby serving as a fixed shaft to the sleeve 3, providing a means of support by which the sleeve 3, threaded shank 2, anvil 1 and wing-nut 6 are free to oscillate, as a single unit, to a limited degree, in either a clockwise or a counterclockwise direction in the elliptically formed outer sleeve 4.

The degree of oscillation of the unit comprised of the anvil 1, threaded shank 2, sleeve 3 and wing-nut 6 in either clockwise or counterclockwise direction is determined by the difference between the radius of the outer surface of the sleeve 3 and the major diameter of the inner surface of the elliptically formed sleeve 4. The pin 5 is located on the minor axis of the sleeve 4. The outer radius of the sleeve 3 is equal to the minor axis of the elliptically formed sleeve 4.

Symmetrically about the center-point of the upper circular surface of the anvil 1 upon which the rivet head rests (see Figs. 1 and 2), is a flat circular depressed inner surface whose sidewalls extend upwards at a slight angle in all directions to merge with the circular outer surface of the anvil 1, said circular outer surface sloping downwards to meet the raised circular rim of the anvil 1.

Position B of anvil 1 (see Fig. 2) shows the anvil 1 in a vertical or upright position, with the head of the rivet resting on the flat circular inner depressed surface, of the anvil 1, preparatory to the final adjustment of the rivet by turning the wing-nut 6 and the threaded shank 2 in the sleeve 3, raising or lowering the rivet through the aligned holes of the various pieces of sheet metal which it is to join; so that at the final adjustment of the rivet, there is a slight amount of space, equal to the depth from the top surface of the anvil 1, between the under surface of the piece of sheet metal in contact with the rivet head and the upper surface of the rivet head.

If, when the rivet is in position B, as described in the above paragraph, the anvil 1, threaded shank 2, sleeve 3 and wing-nut 6 be oscillated in either a clockwise or counterclockwise direction in the elliptically formed sleeve 4, the head of the rivet will be forced into the circular surface of the anvil 1 and will be held tightly up against the under surface of the piece of sheet metal with which it is in contact; since the rivet remains in a vertical position in the aligned holes of the pieces of sheet metal through which it is passed, while the anvil 1 rotates beneath it, in either a clockwise or counterclockwise direction. Position A of the rivet (as shown in Fig. 2) shows the position of the rivet on the circular outer surface of the anvil 1 in comparison to position B; so that it may be clearly indicated that a definite degree of oscillation in either a clockwise or counterclockwise direction of the anvil 1, threaded shank 2, wing-nut 6, sleeve 3 and pin 5 must occur for a tight securance of the rivet head between the outer surface of the anvil 1 and the under surface of the piece of sheet metal with which the rivet head is in contact.

After securing the rivet in position by means of swinging in either a clockwise or counterclockwise direction, the anvil 1, upon which the rivet head rests, the threaded shank 2, the sleeve 3, the pin 5, and the wing-nut 6, as detailed in the preceding paragraphs of this specification; any blows directed by a hammer onto the shank of the rivet while "peening" the rivet will tend to cause the anvil 1, threaded shank 2, sleeve 3 and wing-nut 6 to swing still further in the original direction of oscillation (be it either clockwise or counterclockwise) in the sleeve 4; thereby forcing the head of the rivet, which is resting on the outer surface of the anvil 1, to remain tightly in position up against the under surface of the sheet metal, under the impact of all hammer blows directed onto the shank of the rivet.

Rivet B is shown in Fig. 2 in the central depression in the initial position of the device, with the head of the rivet underlying the underside of the work, the aforesaid predetermined dimension. When the inner sleeve or tube 3 is turned, as described, one or the other of the raised portions, depending upon the direction in which sleeve 3 is turned, will be brought vertical and underlying the rivet. But it will be noted, especially from Fig. 2, that the distance from the pivot axis 5 (see Fig. 1) to the raised portion of the anvil is greater than the distance to the central depression. More particularly, this increase in dimension is in the order of the aforesaid distance between the head of the rivet and the underside of the work. Hence the rivet head will be brought tightly against the underside of the work as a result of said turning of the inner sleeve 3 and its anvil 1.

It will be further noted from Fig. 2 that an axis normal to said raised portion intersects the vertical at a point somewhat above the aforesaid pivotal axis 5 (see Fig. 1) of the device. In consequence, when force is exerted in the peening operation, upon the anvil, more accurately, upon the raised portion thereof, a turning movement will be developed tending to force the anvil further in the direction in which it had been initially turned, as aforesaid.

For purposes of greater mobility and efficiency in use, the unit comprised of the hinge 7, elliptical sleeve 4, female threaded sleeve 3, threaded sleeve 2, anvil 1, pin 5 and wing-nut 6, is capable of a horizontal rotation in a wide arc about the hinge leaf 8; the degree of rotation being limited only by the contact of the elliptical sleeve 4 or the pin 5 with the wing-nut 10 at one end of the arc of rotation, and by the contact of the elliptical sleeve 4 with the hinge leaf 8 at the other end of the arc of rotation.

Having thus described our invention to the best of our ability, what we claim as new and useful and desire to secure by Letters Patent is:

1. In an anvil device for use in riveting sheet metal or other work, in combination, an elliptical sleeve, means for anchoring said sleeve to a point of firm securement, an internally-threaded member pivotally mounted on said sleeve, a lead screw in said threaded member, an anvil secured at one end of said lead screw, said anvil having a central depression and at least one raised portion, said lead screw being turned to bring the head of a rivet rested in said central depression of the anvil a predetermined distance from the underside of the work, the distance from said pivotal axis to the said raised portion being greater than the distance from said axis to the said central depression by the aforesaid predetermined distance, whereby when the threaded member and its said anvil is turned on said pivot, one of said raised portions will underlie the rivet, the head of which will be jammed tight against the underside of the work.

2. The combination according to claim 1 wherein a line normal to the said raised portion of the anvil will intersect the vertical through said pivotal axis at a point above said axis, whereby the force of the peening operation upon the raised anvil portion when turned in one direction, will exert a turning movement tending to further turn the said threaded member and its anvil in the said direction.

DAVID YELLEN.
SEYMOUR MOSKOWITZ.

REFERENCES CITED

The following references are of record in the file of this patent:

FOREIGN PATENTS

| Number | Country | Date |
| --- | --- | --- |
| 376,971 | Germany | June 8, 1923 |
| 724,318 | France | Jan. 25, 1932 |